US008775756B1

(12) United States Patent
McCloskey et al.

(10) Patent No.: US 8,775,756 B1
(45) Date of Patent: Jul. 8, 2014

(54) METHOD OF VERIFYING INTEGRITY OF DATA WRITTEN BY A MAINFRAME TO A VIRTUAL TAPE AND PROVIDING FEEDBACK OF ERRORS

(75) Inventors: Larry W. McCloskey, Burlington, MA (US); Bruce Offhaus, Waldoboro, ME (US); Eric M. Vaughn, Raleigh, NC (US)

(73) Assignee: EMC Corporation, Hopkinton, MA (US)

( * ) Notice: Subject to any disclaimer, the term of this patent is extended or adjusted under 35 U.S.C. 154(b) by 203 days.

(21) Appl. No.: 13/433,477

(22) Filed: Mar. 29, 2012

(51) Int. Cl.
*G06F 1/00* (2006.01)
*G06F 13/00* (2006.01)
*G06F 13/28* (2006.01)
*G06F 7/00* (2006.01)
*G06F 17/00* (2006.01)
*G06F 3/06* (2006.01)
*G06F 11/07* (2006.01)
*G06F 12/00* (2006.01)
*G06F 11/14* (2006.01)
*G06F 17/30* (2006.01)

(52) U.S. Cl.
CPC ............... *G06F 3/06* (2013.01); *G06F 3/0619* (2013.01); *G06F 3/065* (2013.01); *G06F 3/0664* (2013.01); *G06F 11/1446* (2013.01); *G06F 11/0766* (2013.01); *G06F 12/00* (2013.01); *G06F 17/30088* (2013.01); *G06F 17/30377* (2013.01); *G06F 2212/1032* (2013.01); *G06F 2212/151* (2013.01); *G06F 2212/165* (2013.01); *G06F 2201/82* (2013.01); *G06F 2201/84* (2013.01)
USPC ............................ 711/162; 711/159; 707/610

(58) Field of Classification Search
CPC ..... G06F 3/0604; G06F 3/065; G06F 3/0686; G06F 3/0664; G06F 3/0682; G06F 11/1458; G06F 11/1004; G06F 17/30377; G06F 2212/1032; G06F 2212/1008; G06F 2212/151; G06F 2212/165
See application file for complete search history.

(56) References Cited

U.S. PATENT DOCUMENTS

| 8,291,183 B2 | 10/2012 | McCloskey et al. | |
|---|---|---|---|
| 2005/0131968 A1* | 6/2005 | Augenstein | 707/204 |
| 2008/0162813 A1* | 7/2008 | Haustein et al. | 711/115 |
| 2010/0257437 A1* | 10/2010 | Hwang et al. | 714/819 |

OTHER PUBLICATIONS

Press Release "EMC Introduces Data Domain DD670 Deduplication Storage System," [retrieved online on Oct. 18, 2012] Retrieved from the Internet URL: http://www.emc.com/about/news/press/2010/20100719-01.htm.
Press Release "EMC Announces New EMC Disk Library for Mainframe at Share Conference," [retrieved online on Oct. 18, 2012] Retrieved from the Internet URL: http://www.emc.com/about/news/press/2009/20090824-01.htm.

* cited by examiner

*Primary Examiner* — Matthew Bradley
*Assistant Examiner* — Rocio Del Mar Perez-Velez
(74) *Attorney, Agent, or Firm* — Hamilton, Brook, Smith & Reynolds, P.C.

(57) ABSTRACT

A virtual tape emulator (VTE) that performs data integrity read back verification at host sync points. The VTE first flushes data that it may have buffered to a backend storage subsystem such as a disk array. The VTE then reads all data that was written to the backend storage array between a prior sync point and the current sync point. During this feedback verification, integrity checks can be performed. An error detected during read back verification is returned to the host operation that triggered the sync operation.

17 Claims, 2 Drawing Sheets

METHOD OF VERIFYING INTEGRITY OF DATA WRITTEN BY A MAINFRAME TO A VIRTUAL TAPE AND PROVIDING FEEDBACK OF ERRORS

BACKGROUND

Large-scale mainframe computers continue to be used extensively across many industries. Historically, tape storage has been used to provide permanent and temporary data protection services to those mainframes. In such environments, it is not uncommon for mainframe tape libraries to hold hundreds of TeraBytes (TB) of data spread across tens of thousands of tape volumes.

Virtual tape emulation (VTE) products such as DLm available from EMC Corporation of Hopkinton, Mass. can be used to emulate a given number of tape volumes to the mainframe using disk drives as the storage media instead of magnetic tape. As a mainframe-based application writes data to what it believes is a tape drive, that data is actually stored as a tape volume image on direct access storage device such as a disk array subsystem system. Each individual tape volume written by the mainframe becomes a single disk file on the filesystem on the disk array.

Such VTE products ultimately allow the operators of mainframe data centers to move from a tape-based backup solution to a disk-based backup solution, leveraging today's high speed low cost disk technology to provide an innovative approach to data storage.

The mainframe host writes data to the virtual tape drive using the same commands as it would as if it were writing to an actual magnetic tape drive. One of these commands is a synchronization or sync point. These "sync" points are a point in time at which the host mainframe can make a valid assumption that any data previously written to the tape has been safely stored on the tape media. When the sync condition occurs while writing to a real tape, any buffered data not yet written to the media is immediately flushed out to the tape media, from the perspective of the tape drive. The tape drive can therefore immediately detect any write errors that occur during this buffer flushing operation. Upon completing of flushing to the media, a success/fail indication is returned to the host operation (such as an application program) that triggered the sync condition.

In other words, as the host executes a series of write operations to a tape drive, it does expect some buffering to occur such that there will be periods of time when not all of the data is quite yet recorded on the tape. If an error occurs during this time, the mainframe thus should accommodate the fact that some data may be lost. The understanding between the mainframe and the tape drive is that, until the sync point is reached, errors may occur that result in data loss, and the mainframe should take steps to accommodate such possible data loss. However once the host issues a sync command, the host typically expects to then wait until the tape drive reports that all data has been safely written, before taking another action.

Virtual tape systems introduce one or more layers of additional buffering not only in the virtual tape server itself, but also in the backend storage filesystems. As a result, there is no guarantee of immediate feedback in response to a write error. In a worst case scenario, error status may not be returned to the virtual tape emulator from the backend storage system until after the entire filesystem has been written and closed. This can be long after the host mainframe can tolerate a waiting period after the sync points, and long after the host may have made decisions based on the false assumption that the data was safely written.

In addition, any errors in transmission that were not detected by the backend storage system, or undetected errors introduced by the backend storage system itself, may not be reported to the virtual tape server at all. In this case the mainframe will not even see the errors. Such data integrity errors will only be detected at a much later time if and when the mainframe finally attempts to read the data back.

The problem is further exacerbated by the fact that the backend storage array itself has latency. Although disk drives are quite fast as compared to tape drives, the storage array may implement services such as RAID, de-duplication, replication, garbage collection, or other filesystem management services that control exactly where each piece of a filesystem resides and on which physical disk, and at what time. These backend management services further introduce buffering and/or latency in a way such that the virtual tape emulator has no control over it, nor even any visibility into it.

In prior art approaches, it was assumed that backend storage arrays would successfully complete the data writes. Thus no verification of virtual tape integrity was performed until it was incidentally tested if and/or when the mainframe eventually reads the virtual tape contents back. This approach did not give immediate feedback to the mainframe program during the virtual tape sync process, and thus the mainframe could not perform timely error reporting and/or execution recovery operations, such as informing the application so that the application could rewrite the data. The host application will have completed with a premature assumption that the data is safely written on the virtual tape, and thus taking subsequent actions that will result in irretrievable data loss, such as permitting the application to delete the original data from a source elsewhere available to the mainframe.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION

A description of example embodiments follows.

Figure 1:
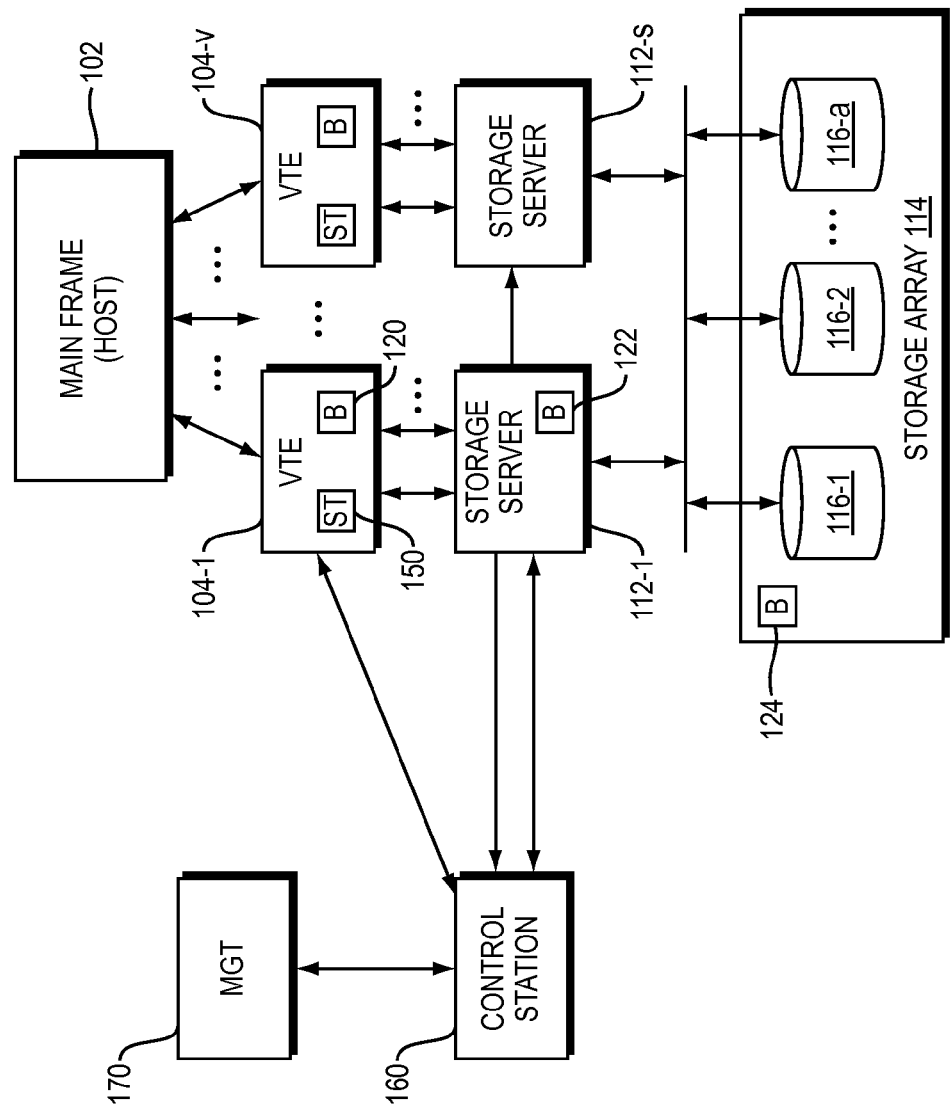
FIG. 1 is a high-level block diagram of a tape emulation system.

FIG. 1 is a high-level block diagram showing a data processing environment in which data integrity read verification can be implemented in a virtual tape emulator according to the teachings herein. The environment includes a host also called a mainframe 102 herein, and one or more virtual tape emulation (VTE) subsystems 104-1, . . . , 104-v such as the Disk Library for mainframe (DLm) product available from EMC Corporation of Hopkinton Mass. The tape emulation subsystem(s) 104 connect to the mainframe 102 via high-speed FICON or ESCON channel data connection(s). Despite using direct access storage devices such as disk drive arrays 116-1, . . . , 116-a as the mass media, they appear to the mainframe 102 as a physical tape drive, and therefore execute typical tape-like commands and respond to such commands in the same way that a physical tape drive would respond. This means that existing work processes based on tape management systems and applications can run on the mainframe 102 without any modifications.

An example VTE 104-1 operates as an input/output controller between the mainframe 102 and a disk based storage subsystem 116-1, . . . , 116-A that can, for example, be a standard open-systems disk storage subsystem. The VTE 104-1 can thus be said to emulate a given number of virtual tape volumes to the mainframe 102. As will be understood shortly, the VTEs 104 include a local buffer (B) 120 for use emulating tape commands as well as a sync table (ST) 150.

The backend storage subsystem stores the data as one of a plurality of tape volume images. Each individual tape volume image written by the mainframe 102, can, for example, be a single disk file or a complete filesystem.

The tape emulation subsystem may consist of an internal local area network and one or more storage servers 112-1, . . . , 112-s that manage the backend disk array(s) 116-1, . . . , 116-a. It should be understood that the backend storage arrays 114 may implement a hierarchy of storage protocols such as Redundant Array of Independent Disks (RAID), storage array network (SAN), data de-duplication, replication, garbage collection, and/or other storage management functions that may not be visible to or under the control of the storage servers 112, and are certainly not visible or under the control of the VTE 104 or the mainframe 102. The storage servers 112 may typically include one or more internal buffers 122 in which they store data temporarily as it is managed and passed back and forth between the storage arrays 116 and the VTE 104.

In operation, the host mainframe 102 issues read and write commands to the virtual tape emulator(s) 104 using typical tape access commands. In accordance with these tape-centric protocols, there is the concept of a "synchronization point" at which the host 102 can make an assumption that any data it has previously asked to be written is indeed safely stored on the media. When such a sync condition occurs while writing to a prior art physical tape based system, any buffered data not yet written to the magnetic media is immediately flushed to the tape media. The physical tape drive can thus detect and immediate report back to the host any errors that occur during this flushing operation. Upon completion of the flush to the tape media, an immediate successful or failed operation can be returned by the host to the application that triggered the sync operation.

However, in an environment such as that shown in FIG. 1, a virtual tape emulation (VTE) subsystem 104 is used instead. This system not only includes buffering 120 in the VTE 104, but also introduces buffering 122 in the storage server(s) 112 as well as an indeterminate amount of buffering 124 and/or latency in the backend file storage management of the disk arrays 116-1, . . . , 116-a to implement RAID, replication, de-duplication, and other storage-centric functions. The VTE 104 has no visibility into these operations, some of which may introduce errors long after any host operation can tolerate a waiting period. Therefore it is not possible for the VTE to actually provide authoritative and immediate feedback to any write error introduced by the backend storage system 116. At best, a delayed error status may be returned after a file, or even an entire virtual tape, has been written and closed by the application. This may occur well after the sync points at which the host may have made decisions based on the false assumption that all data was safely written.

Figure 2:
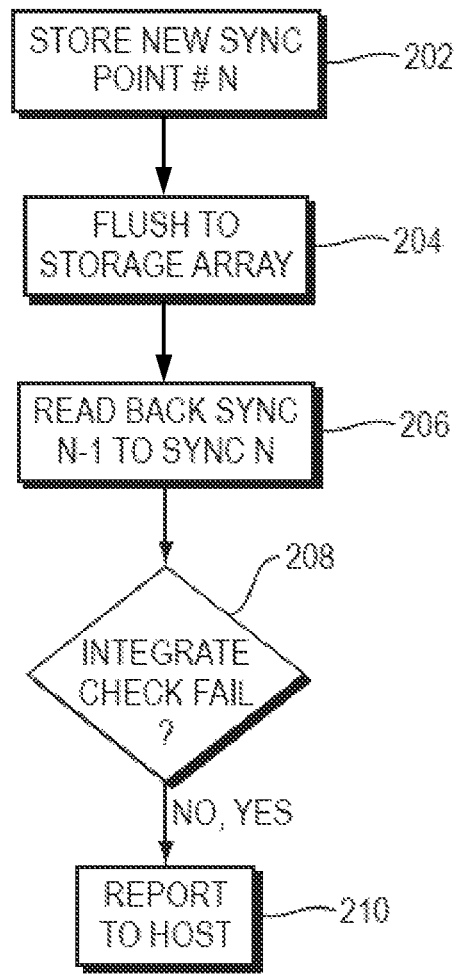
FIG. 2 is a flow diagram of the data integrity read verification process.

To solve this problem, data integrity read verification is implemented in one or more of the VTEs 104 as shown in FIG. 2. Here a first state 202 is entered at which the mainframe informs the VTE 104 that a new sync point has occurred. In this state, information concerning the new sync point is stored in the sync point table 150. The sync point information may include a running index number, N, as well as information such as the location on the virtual tape at which the sync occurred.

In a next step 204, the VTE 104 flushes all data remaining in its buffer 120 to the storage servers 112. The storage servers 112, in turn, manage actual writing of this data to the backend disk arrays 116 on a schedule that is managed by the storage servers 112. The schedule of writing data to the backend disk arrays 116 is not under control of the VTE 104.

Thus, although the VTE 104 has flushed its buffer 120 to the storage server 112, it does not yet report back to the host. Rather, in state 206, the VTE 104 consults the local sync point table 150 to determine a previous sync point, such as sync point index N−1. The VTE then requests read back of all data from the backend storage devices 116 ranging from the previous sync point N−1 up to the present sync point N. As this process occurs, a state 208 is also executed in which an integrity check is performed on the data that has been read back. This integrity check may include header confirmation, cyclic redundancy checking (CRC) or other data integrity checks.

Following the integrity check in state 208, a state 210 returns the integrity check status to the host operation that initiated the sync.

A person of ordinary skill in the art will appreciate that embodiments or aspects of the method and system described above may be implemented in the form of hardware, software, or firmware. If implemented in software, the software may be any form of software capable of performing operations consistent with the example embodiments disclosed herein. The software may be stored in any non-transient computer readable medium, such as RAM, ROM, magnetic disk, or optical disk. When loaded and executed by processor(s), the processor(s) are configured to perform operations consistent with the example embodiments disclosed herein. The processor(s) may be any form of processor(s) capable of being configured to execute operations as disclosed herein.

As a result of this data integrity read back upon sync function, the mainframe application program receives immediate feedback in state 210 as to any errors occurring in writing process as shown in FIG. 2. The system may provide immediate or near-real time feedback on any errors in the writing process sent by the backend storage arrays, which are not directly controlled by the VTE server or controlled by the host. This allows the mainframe application to perform error reporting and/or even error recovery such as taking steps to rewrite the data. This can also avoid the need for the mainframe application from taking further actions that would otherwise result in irretrievable data loss.

The approach presented here is thus to perform a data integrity read back verification at every host sync point. More particularly, when a sync condition occurs, the virtual tape server first flushes data that may be buffered to the backend storage array. However, rather than simply wait for the backend system to report it is finished with an operation, or merely report a successful operation at this point, the VTE instead issues a read command for all of the virtual tape data that was previously written to the backend storage array between a prior known sync point and the current sync point. During this feedback verification, integrity checks can be performed, such as header confirmation and Cyclic Redundancy Checking (CRC). Other types of data integrity checks may also be performed. If an error is detected during this data integrity read back verification, an error status is returned to the host operation that triggered the sync operation, giving real-time feedback to the host.

While this invention has been particularly shown and described with references to example embodiments thereof, it will be understood by those skilled in the art that various changes in form and details may be made therein without departing from the scope of the invention encompassed by the appended claims.

What is claimed is:

1. A method comprising:
   emulating operations of a virtual tape system to a mainframe processor;
   forwarding data received from the mainframe processor for storage by a backend storage subsystem;
   receiving a sync point indication from the mainframe;
   in response to receiving the sync point indication;
      storing information concerning a sync point;
      flushing data to the backend storage subsystem not yet forwarded; and
      performing data integrity read back verification of data using the sync point information.

2. The method of claim 1 wherein the data integrity read back verification is performed on data that was stored between a current sync point and a prior sync point.

3. The method of claim 1 wherein a result of the data integrity read back verification is returned to the mainframe.

4. The method of claim 3 wherein the result of the data integrity read back verification is returned to a mainframe application that triggered the sync point.

5. The method of claim 1 wherein the backend storage subsystem comprises direct access storage devices.

6. The method of claim 1 additionally comprising:
   maintaining a list of past sync points.

7. The method of claim 1 wherein the backend storage subsystem performs further storage subsystem functions, and the further storage subsystem functions are not controllable by the emulation step.

8. The method of claim 7 wherein the further storage subsystem functions comprise one or more of RAID, data de-duplication, replication, or garbage collection.

9. An apparatus comprising:
   a virtual tape emulator, connected to receive data and instructions from a mainframe processor, and connected to forward the received data for storage by a backend storage subsystem, and to read data from the backend storage subsystem;
   a memory, for storing information concerning a sync point instruction from the mainframe; and
   a data integrity checker, for verifying data read back from the backend storage system in response to the sync point instruction using current sync point information and sync point information previously stored in the memory.

10. The apparatus of claim 9 wherein the data integrity checker further verifies data that was written by the backend storage system between a current sync point and a prior sync point.

11. The apparatus of claim 9 wherein the virtual tape emulator further returns a result of verifying data read back to the mainframe.

12. The apparatus of claim 11 wherein the result of verifying data read back is returned to a mainframe application that issued the sync point instruction.

13. The apparatus of claim 9 wherein the backend storage subsystem comprises direct access storage devices.

14. The apparatus of claim 9 additionally wherein the memory stores information comprising a list of past sync points.

15. The apparatus of claim 9 wherein the backend storage subsystem performs further storage subsystem functions independently of the operation of the virtual tape emulator.

16. The apparatus of claim 15 wherein the further storage subsystem functions comprise one or more of RAID, data de-duplication, replication, or garbage collection.

17. A programmable computer product for emulating a virtual tape drive to a host processor, the programmable computer product comprising one or more data processing machines that retrieve instructions from one or more stored media and execute the instructions, the instructions for:
   performing a data integrity read back verification upon receipt of a current sync point from a host, by
   flushing data previously buffered to a backend storage array;
   issuing a read command for virtual tape data that was previously written to the backend storage array between a prior known sync point and the current sync point;
   performing an integrity check on data received in response to the read command; and
   returning an error status to a host operation that triggered the sync operation, giving real-time feedback to the host.

* * * * *